April 7, 1931. P. R. HOOPES 1,799,749
TRIMMING MACHINE
Filed Aug. 24, 1923 8 Sheets-Sheet 4

Fig. 4

April 7, 1931.  P. R. HOOPES  1,799,749
TRIMMING MACHINE
Filed Aug. 24, 1923    8 Sheets-Sheet 6

Inventor
Penrose R. Hoopes
By his Attorneys
Emery, Booth, Janney & Varney

April 7, 1931.  P. R. HOOPES  1,799,749
TRIMMING MACHINE
Filed Aug. 24, 1923    8 Sheets-Sheet 8

Inventor
Penrose R. Hoopes
By his Attorneys

Patented Apr. 7, 1931

1,799,749

UNITED STATES PATENT OFFICE

PENROSE R. HOOPES, OF HARTFORD, CONNECTICUT, ASSIGNOR TO ESSEX RUBBER COMPANY, OF TRENTON, NEW JERSEY, A CORPORATION OF NEW JERSEY

TRIMMING MACHINE

Application filed August 24, 1923. Serial No. 659,068.

This invention relates to cutting machines and pertains more particularly to an automatic trimming machine.

It is an object of this invention to provide a machine which will automatically feed articles to be cut or trimmed to cutting position, to present the surface or edges to be trimmed to the cutter, and to deliver the trimmed article from the machine.

It is a further object of this invention to provide a machine of the character described which will perform the cutting operation efficiently and exactly, cutting or trimming the article to the limit desired without injury to the article itself.

Other objects and advantages of the invention will appear hereinafter.

A preferred embodiment of the invention selected for purposes of illustration is shown in the drawings, and therein.

Referring to the drawings, the machine is supported on a pair of frame members 1 and 2 which may be suitably mounted on a base 3, said base being adapted to rest upon a bench or to be supported upon legs as may be most convenient. Journaled in the upper ends of the frame members is a drive shaft 4 on one end of which may be fixed a suitable drive pulley 5. If desired, a clutch 6 of any suitable construction may be interposed between the pulley and the shaft to provide a convenient means for disengaging the machine from the source of power to which it may be connected. A hand wheel 7 may also be fixed to the drive shaft and may be used in setting or adjusting the machine.

A cam shaft 8 is also journaled in the frames 1 and 2 and carries on one of its outer ends a gear 9 which meshes with and is driven by a gear 10 mounted on the drive shaft 4. The opposite end of the cam shaft 8 carries an arm 11 the outer end of which carries a stud on which is journaled a roller 12.

The arm and roller form the driving mechanism for a Geneva star wheel 13 journaled on a stud 14 fast in the frame 2. The star wheel has formed therein a series of grooves 15 with which the roller 12 is adapted to cooperate, each complete turn of the cam shaft 8 and the arm 11 imparting a quarter turn to the star wheel.

The periphery of the star wheel 13 has four segments 13' cut therefrom which cooperate with the outer periphery of the locking plate 11' secured to the cam shaft 8 to lock the star wheel in fixed position during the interval in which the arm 11 is advancing to engage the next succeeding groove. The locking plate 11' is also cut away as at 11" to provide clearance for the star wheel to rotate during the time when the roller 12 engages the groove 15 to advance the star wheel to its next position.

A spur gear 16 is doweled or otherwise suitably fastened to the star wheel 13 to revolve therewith on the stud 14 which gear meshes with a gear 17 and a gear 18 to revolve said gears with an intermittent motion received from the Geneva star wheel. Gear 17 is mounted on a shaft 19 journaled on the main frames 1 and 2, the shaft carrying a feeding turret 20 also thereon.

The embodiment of the invention selected for purposes of illustration is designed primarily for use in trimming from rubber heels edges or overflow formed thereon in the process of moulding. Feeding turret 20 is provided, therefore, with a series of resilient holders 21 shaped to hold a heel by frictional engagement with the periphery of said heel. Holders 21 are conveniently made of spring steel or other suitable resilient material and are open at one end to facilitate the introduction by hand of a heel therein and also to allow of said heel being removed from the feeding turret by the carrier turret as hereinafter described.

In order to allow of handling heels of various shapes and sizes, holders 21 are removably fastened to feeding turret 20 by screws or other approved means and are thereby adapted to be readily removed from position, and other similar holders of different size or shape substituted in their place. When the machine is in operation the feeding turret 20 is revolved intermittently as described, and the heels to be trimmed may be placed in the holders 21 by hand as each holder successively comes to rest in receiving position.

The gear 18 is mounted on the carrier turret shaft 22 also journaled in the main frames 1 and 2. Mounted on the shaft 22 between the main frames 1 and 2 are a pair of turret frames 23 and 24. Gears 16, 17 and 18 are the same size and contain the same number of teeth and it will be observed, therefore, that the feeding turret 20 and the turret frames 23 and 24 are rotated in synchronism, each being rotated intermittently one-quarter of a turn at a time.

The turret frames 23 and 24 are used to carry the heels or articles to be trimmed to the cutters and means are provided, therefore, to grasp the heels as they are held in the feeding turret and to move them to cutting position. The turret frame 23 is accordingly provided with a plurality of stationary chucks 25 and the turret frame 24 is provided with a series of movable chucks 26, the movable chucks being urged in the direction of the fixed chucks 25 by coil springs 27. The springs 27 are sufficiently stiff that a heel, when placed between the chucks 25 and 26, will be grasped and held firmly therebetween.

Means are provided whereby the chucks may be separated to release a heel held therebetween and may be held in separated position until another heel is in position to be grasped from the feeding turret. Forked levers 30 are accordingly provided which are pivoted intermediate their ends at 32 between bosses 33 which may preferably be formed integrally with the turret frame 24, the forked ends of the levers being connected to the movable chuck shafts to impart endwise motion thereto while permitting rotation thereof. The other end of the lever 30 carries a stud on which a roller 40 is free to turn. A cam sector 34 is journaled loosely on the shaft 22 and is pivoted at 35 to an arm 36 having its other end forked to surround the squared block 37 journaled on the cam shaft 8. The shaft 8 carries thereon a cam 38 on which rides a roller 39 mounted on the arm 36.

As the cam shaft 8 is rotated, thus rotating the cam 38, the cam sector 34 will be oscillated on the shaft 22 as an axis.

The cam sector 34 is so shaped as to normally engage the roller end of the lever 30 when the latter is in position A, at which point the chucks are held open, allowing the heel to be positioned between them by the feeding turret. After a heel is thus positioned between the open chucks, and before the succeeding indexing of the turrets, the cam sector 34 is swung downwardly by the cam 38 acting through the arm 36, this downward motion of the sector 34 causing the roller 40 on lever 30 to run off the beveled end of the sector 34 thus allowing the chuck 26 to move inwardly under the pressure of spring 27 and thus to resiliently clamp the heel between the chuck faces. It will also be apparent that the downward swing of the sector 34 will cause the lower end of the sector to engage the roller end of the lever 30 at position D and will therefore release the trimmed heel held by the chucks at this position, the same mechanism serving to simultaneously clamp an untrimmed heel at position A and release a trimmed heel at position D.

It is desirable that all sides of the heel or article being trimmed be presented to the cutting mechanism. Means are provided, therefore, to rotate the chucks holding the heels for this purpose, this rotation taking place when the chucks are in positions B and C adjacent the cutting mechanism. The stationary chucks 25 are provided at their outer ends with gears 45 which mesh with gears 46 carried on shafts 47 journaled in the turret frames. The movable chucks 26 are surrounded by sleeves 48 and are keyed thereto in any usual manner. The sleeves 48 have gears 49 preferably formed integrally therewith which mesh with gears 50 similar to the gears 46 and also mounted on the shafts 47. The pairs of gears 45 and 49 and 46 and 50 are preferably formed with the same number of teeth so that rotation of the shafts 47 will transmit a simultaneous and like rotation to each of the chucks 25 and 26.

The hubs of the gears 46 are provided with arcuate slots 51 which engage a circular ring 65 mounted on the frame 1, which ring acts as a key and prevents rotation of the gears 46 except at positions B and C, at which points the ring 65 is broken to receive the rotatable keys 52 carried on stud shafts 53 journaled in the frame 1, which rotatable keys are given alternating rotations in a forward and backward direction at the proper time in the following manner.

A gear 54 mounted on the outer end of the stud shaft meshes with a gear 55 loosely mounted on the turret shaft 22. The gear 55 is fixed to a smaller gear 56 which meshes with a gear sector 57 pivoted to the frame 1 on a stud 58. An arm 59 is rigidly connected thereto and pivoted to the arm at 60 is a forked arm 61 which engages and slides on a squared block 62 loosely mounted on the shaft 8. A cam track 63 is formed in the drive gear 9 which cam cooperates with the roller 64 on the arm 61 to impart an oscillating motion to the gear sector 57.

As will be observed, motion of the gear sector in one direction will rotate the heels in one direction, while a counter rotation of the gear sector will rotate the heels in the opposite direction. The sizes of the gears are so arranged that a complete rotation of the heel is preferably obtained in each direction, although obviously by changing the size of the gears the amplitude of rotation may be varied to rotate the heels either less or more than a complete revolution.

Having now described the mechanism by which the articles to be trimmed are fed to cutting positions designated in the drawings by B and C, and the mechanism by which such articles are rotated in cutting position, the cutting mechanisms which perform the trimming operation will next be described. In the preferred embodiment illustrated, referring particularly to Figure 6, a pair of cutters is provided which are preferably offset from each other in such manner that each of the cutters may trim a different edge of the heel. The cutters 70 and 71 are pivotally mounted on the main frames 1 and 2 on shafts 72 and 73.

Since the two cutters are identical only one need be described in detail herein. The cutter consists of a cutter head 74 fixed to a shaft 75 journaled in a frame 76. On the outer end of the shaft 75 is a bevelled gear 77 which meshes with a bevelled gear 78 fixed to the driving shaft 79. In order to provide longitudinal adjustment of the cutter, a sleeve 80 may be provided which is screw threaded at 81 to engage a corresponding screw thread in the frame 76.

The cutter head 74 comprises a series of blades 82 mounted on a web 83, the cutting edges of the blades being ground in spherical form to cooperate in shearing relation with an annular cutting edge 84. This cutting edge forms the upper edge of a cup 85, the openings 85' being provided through which chips and fragments may fall if dropped into the cup in cutting. The cup is rotatively mounted in a depending web 86 of the frame 76 and is carried in a sleeve 87 firmly fixed to the web 86 by a bolt 88. Longitudinal adjustment of the cup may be effected by proper adjustment of the screw threaded collar 89 and the freedom of rotation of the cup may be adjusted by a nut 90 on the outer end of the shaft.

As an additional means of removing chips or waste material trimmed from the heels, the bottom of the cup 85 may be provided with a passage 110 extending downwardly therefrom and opening into a transverse passage 111. This passage may in turn be connected with an annular groove 112 from which leades a flexible tube 113 which may be connected to a suitable source of compressed air.

When the machine is in operation a blast of air may be directed through this passage to blow the chips out of the cup. It is also proposed to introduce lubricating oil through the tube 113 with the air to lubricate the cutters. The outside edge of the cup 85 adjacent the cutting edge 84 forms a guiding edge 84' which may be pressed against the outside periphery of the heel to be trimmed to maintain the cutter in proper shearing relation with the heel as it is rotated.

In order that the cutter may be adjusted to proper shearing relation with the article to be trimmed, a transverse frame 91 is provided which is rigidly connected at its ends to the frames 1 and 2. Slidably mounted on frame 91 is a slide 92 which is retained upon frame 91 by tapered gibs 93. One of these gibs is loose on frame 91 but secured thereto by clamping screws 93' by means of which it can be caused to securely clamp slide 92 in any desired fixed position, or by loosening said screws, gib 93 will allow of endwise adjustment of the slide 92 in frame 91. A screw 94 is threaded into slide 92 and journaled in frame 91, being retained against endwise motion by collars abutting the frame. Rotation of this screw will cause endwise motion of slide 92 and hence permit of close lateral adjustment of said slide.

Figure 6:
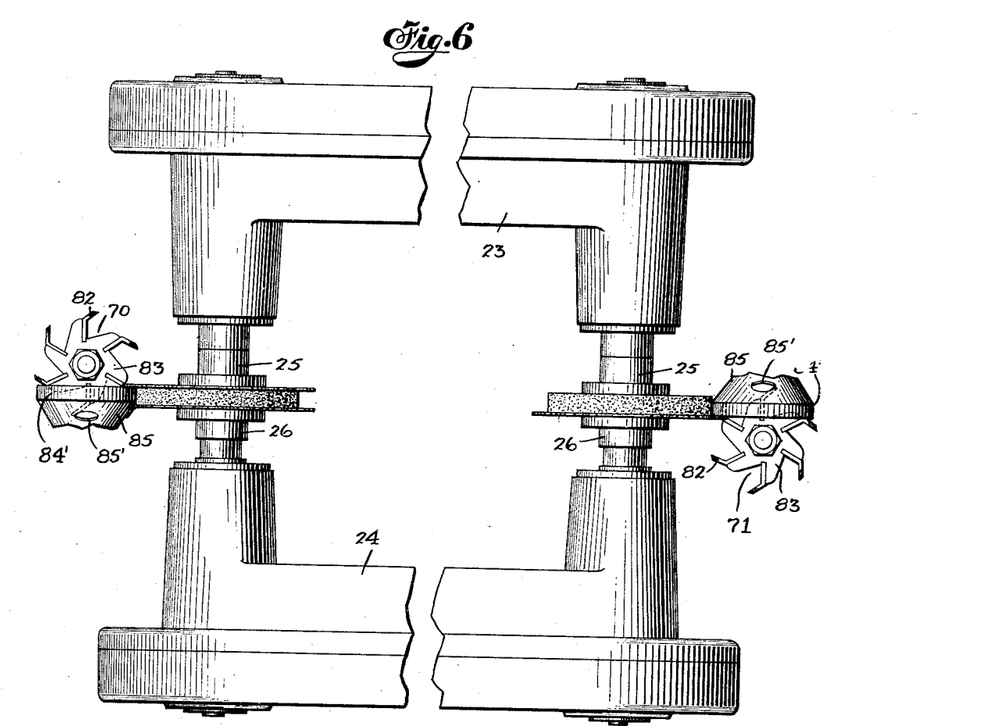
Figure 6 is a composite semi-diagrammatic view showing the positions of the cutters relative to the material being trimmed.
Figure 7:
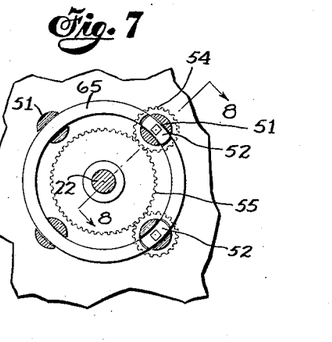
Figure 7 is a detail section on the line 7—7 of Figure 3.
Figure 8:
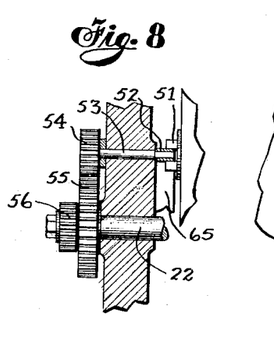
Figure 8 is a section on the line 8—8 of Figure 7.
Figure 9:
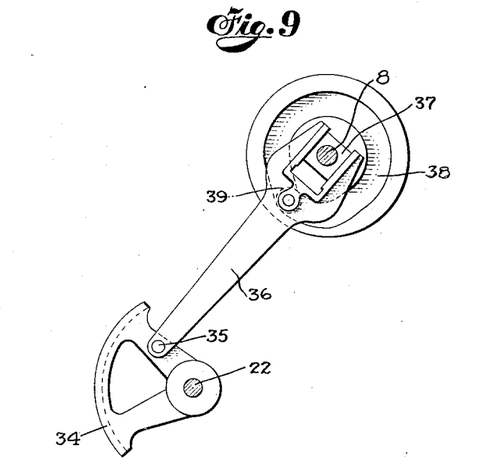
Figure 9 is a section on the line 9—9 of Figure 3.
Figure 10:
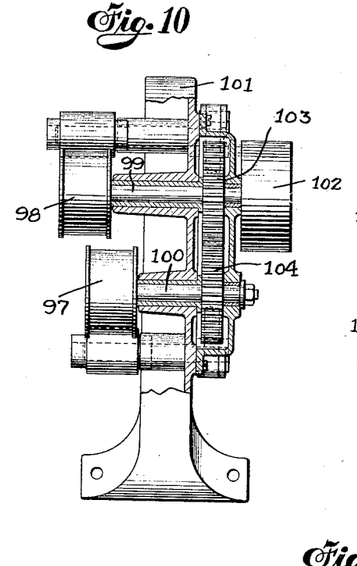
Figure 10 is a rear view of the cutter drive mechanism certain parts being shown in section.
Figure 11:
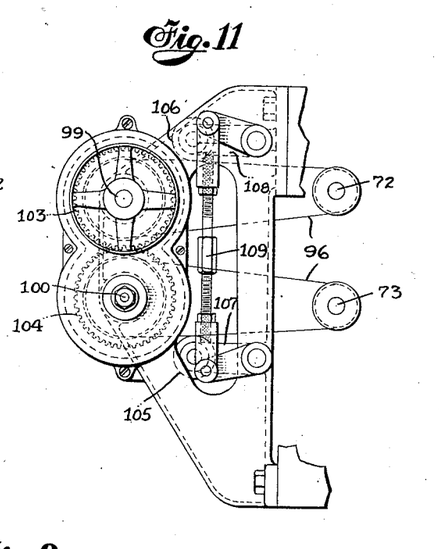
Figure 11 is a side view of the same.
Figure 12:
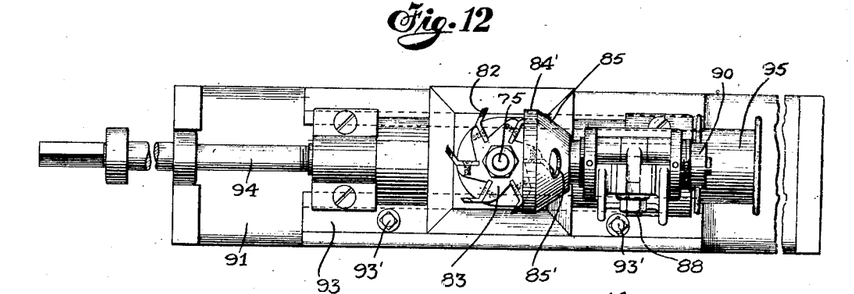
Figure 12 is a plan view of the cutter mechanism.
Figures 13, 14:
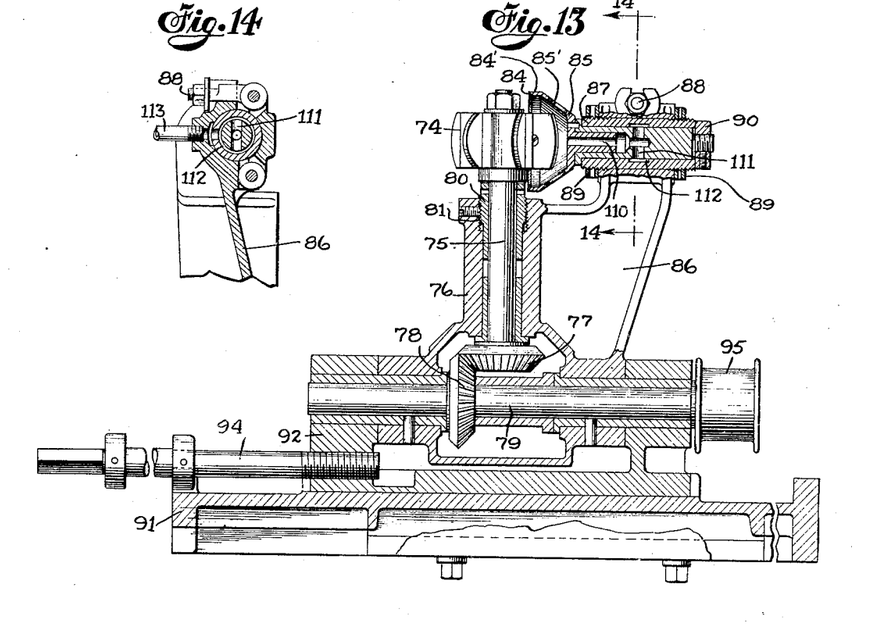
Figure 13 is a sectional elevation of the same.
Figure 14 is a section on the line 14—14 of Figure 13.

The cutters should be so adjusted in this manner that when the periphery of an object is pressed against the guiding edge 84' of the cup 85, the surplus material to be removed will overhang the cutting edge 84 of the cup, as shown in Figure 6, and will be sheared off by the rotating cutters 70 and 71. The shape of the cut will be arcuate, it will be convex toward the periphery of the article being trimmed, and will be tangent to the periphery of the article at the point where said article contacts with the guiding edge 84' of the cup.

As the heel is rotated by the mechanism before described, the point of contact of its periphery with the guiding edge of the cup may move from side to side across the guiding edge of the cup, and the point of tangency of the cup with the periphery of the article will likewise move in a corresponding manner, the movement depending upon the contour of the article being trimmed and upon the manner in which the article is rotated. Cutting will take place at any point within the limits of the arc of contact of the cutter 74 with the edge 84 of the cup 85, and provided that contact of the article with the guiding edge 84' is maintained within these limits of shearing cooperation between the cup 85 and the cutter 74, the surplus material will be accurately removed.

The cutters are preferably rotated independently of the feeding mechanism and pulleys 95 are accordingly provided on the ends of shafts 79 over which are run belts 96 connecting pulleys 95 with pulleys 97 and 98 which are mounted on shafts 99 and 100, these shafts being journaled in a bracket 101, which may be suitably secured to the main frame 1. A driving pulley 102 is also mounted on the shaft 99, and rotation of the shaft 99 is communicated to the shaft 100 by a pair of intermeshing gears 103 and 104 mounted thereon. If desired, a belt tightener may be provided consisting of a pair of rollers 105 and 106 bearing on the belts 96 and mounted on arms 107 and 108 which may be connected and adjusted by a suitable turn buckle 109.

Figure 1:
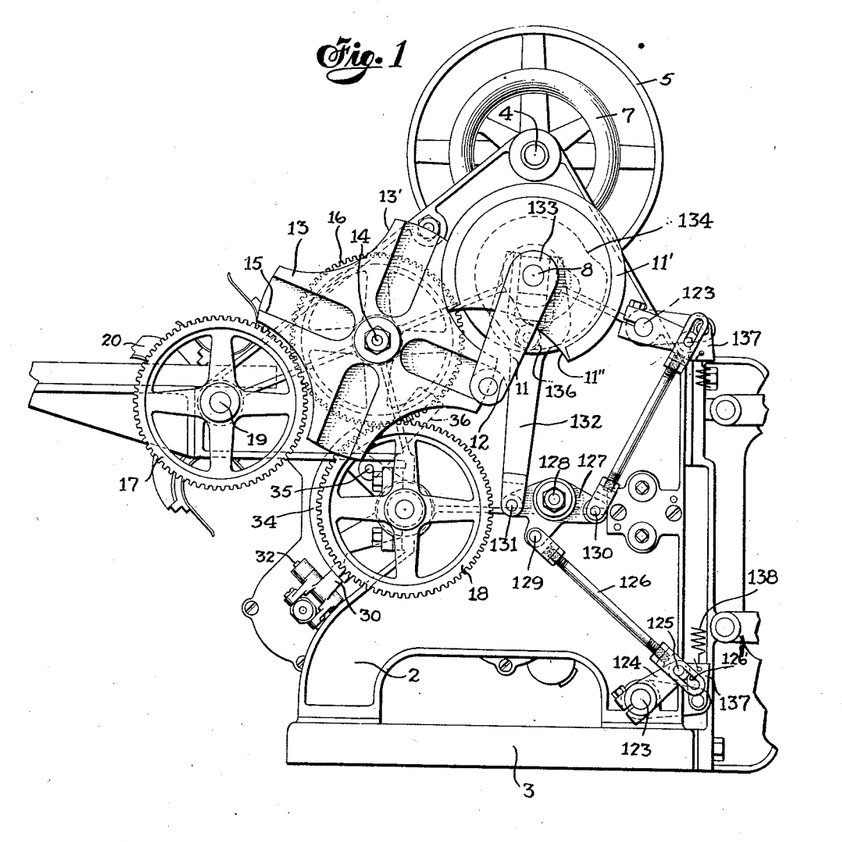
Figure 1 is a right side elevation of the machine.
Figure 2:
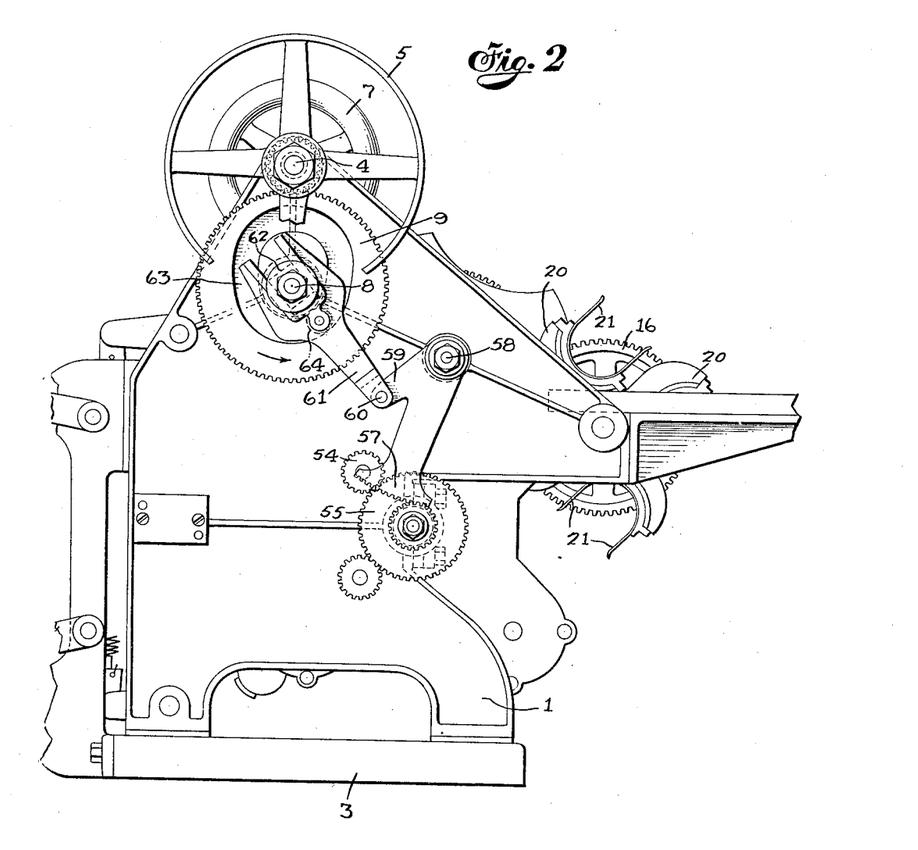
Figure 2 is a left side elevation of the machine.
Figure 3:
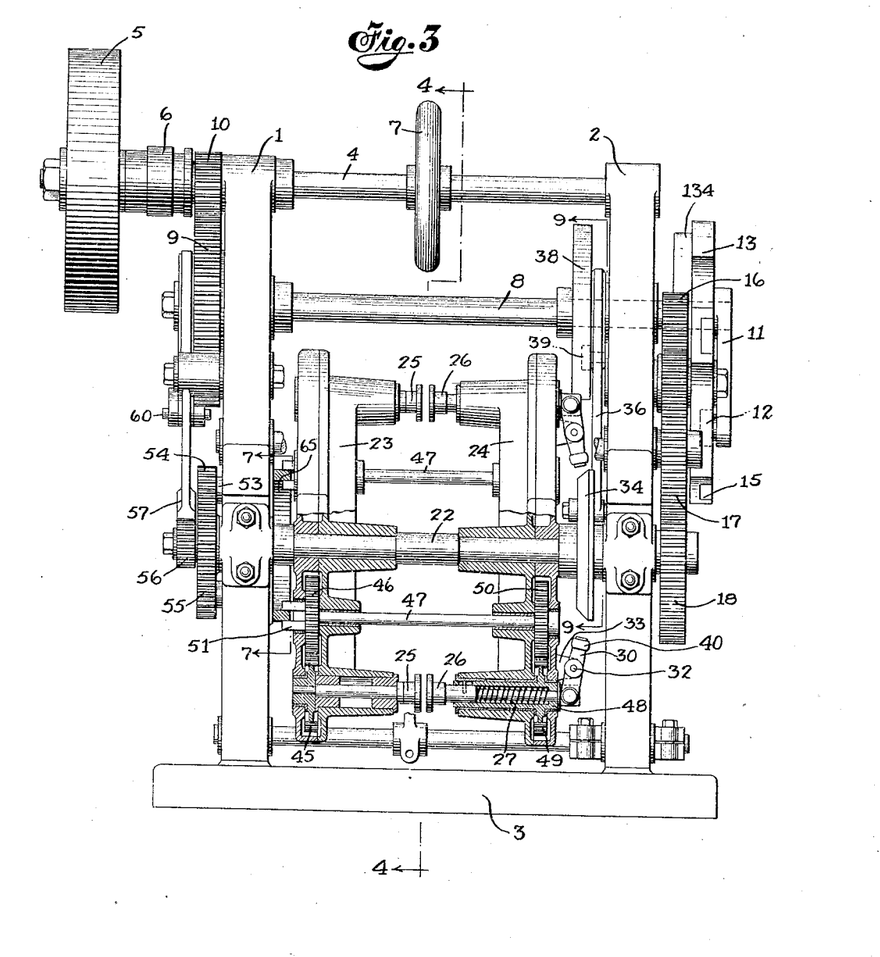
Figure 3 is a front elevation, certain parts being shown in section, the turret frames being shown in the middle of their swing.
Figure 4:
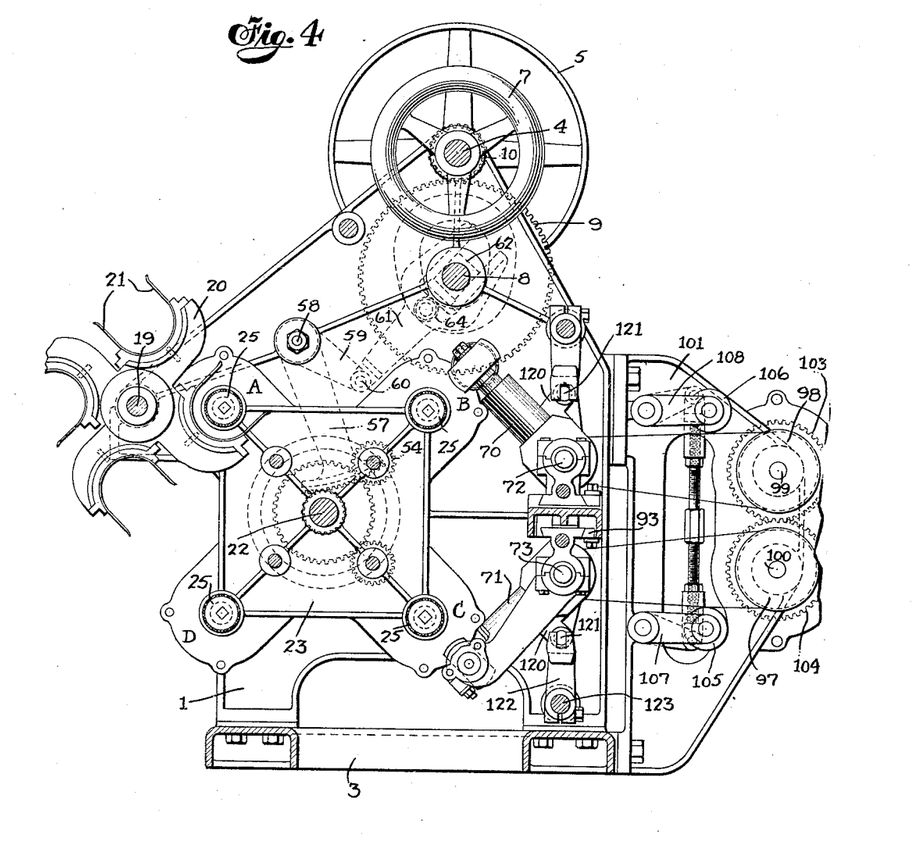
Figure 4 is a section on the line 4—4 of Figure 3.

It may be desirable to remove the cutters from cutting position at such times as the heels are being moved to cutting position, as for instance, from position A to position B, or from position B to position C. In the preferred embodiment illustrated means are accordingly provided for swinging the cutters away from cutting position and synchronizing the movements of the cutters with the movement of the turret frames in such manner that when the turret frame is being rotated the cutters are moved from cutting position, and when the turret frame is positioned in cutting position, as in Figure 4, the cutters will be swung in position adjacent the article to be trimmed.

As set forth before, the cutters are journaled for rotation about the shafts 72 and 73. The cutter frames are provided with a projecting web portion 120 in which is journaled a stud shaft 121 which is flattened on two sides to slide in the end of the forked arm 122. This arm is secured to a shaft 123 by a screw or other suitable means, the shaft being journaled in the main frames 1 and 2. Arms 122 are fixed to the shafts 123 on the inside of the main frames and arms 124 are fixed by suitable screws to the shafts on the outside of the frames. Arms 124 carry pivots 125 at their outer ends which may operatively engage the slotted end portions of the links 126. A three-armed bell crank 127 is journaled on a stud 128 fast in the main frames 1 and 2, two of the arms being pivoted to the links 126 at 129 and 130. The third arm is pivoted at 131 to a forked arm 132, the fork engaging a squared block 133 loosely journaled on the shaft 8. A cam 134 is fixed on the shaft which cam cooperates with a roller 136 journaled on a stud fast on the arm 132 to reciprocate the arm and thus oscillate the three-armed bell crank and the links 126 and thus the cutters 70 and 71.

Arms 137 are also fixed to the shafts 123 and each has connected to its outer ends one end of the springs 138, the other end being connected to a suitable fixed point 139 on the frame 2. As will be observed, the springs form a yielding means to hold the cutters toward trimming position, in which position they remain except when oscillated by the cam 134 and its associated mechanism.

It will be observed that the links 126 are provided with slots 126' which form a lost motion connection between the controlling cam and the cutters. These are provided in order that the cutters may oscillate back and forth in following the contour of the heels as they are held in contact therewith by the springs 138.

Figure 5:
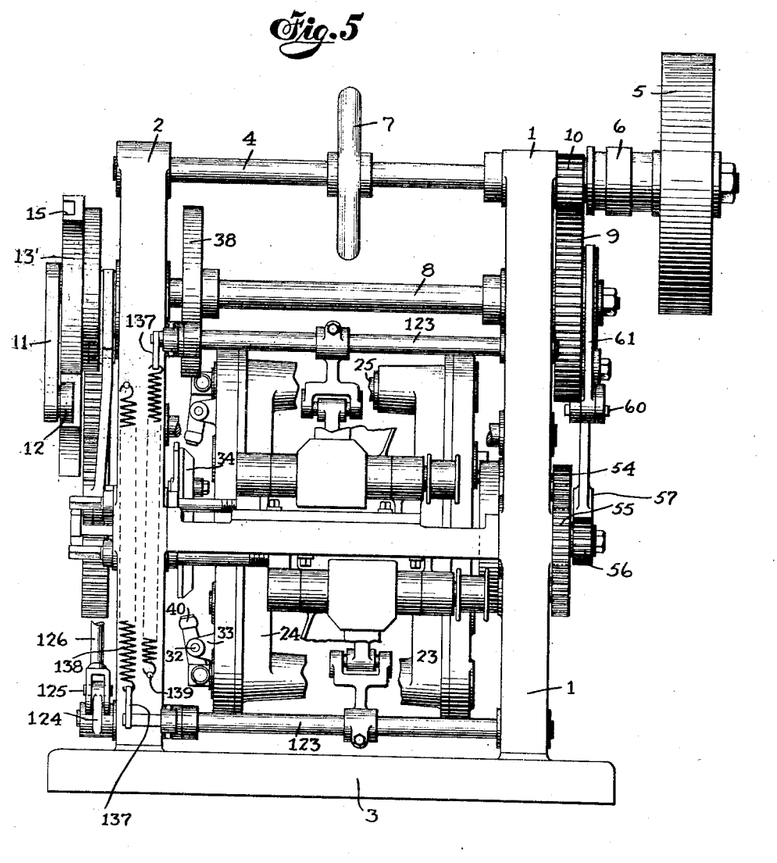
Figure 5 is a rear elevation, certain parts being broken away.

It will be observed, referring particularly to Figures 5 and 6, that the cutters are offset somewhat with respect to each other. This arrangement is provided in the preferred embodiment in order that two edges may be cut from a heel in a single passage of the heel through the machine. It will be apparent, however, that by suitable lateral adjustments of the cutter that the machine may be conditioned to permit objects of varying thicknesses, or that by bringing the cutters into line, both cutters may operate upon a single edge.

In explaining the operation of the machine, it will be convenient to follow the passage of a single heel through the machine, it being understood that in operation the heels are fed continuously into the feeding turret 20 as fast as it is revolved. Assuming that suitable power has been provided for driving the pulley 5, and for driving the pulley 102 of the cutter mechanism, the clutch 6 may be conditioned to drive the shaft 4 and the mechanisms of the machine. As has been explained, an intermittent step-by-step motion is imparted to the feeding turret 20 and the turret frames 23 and 24. If a heel is placed in the frame 21, it will be carried by rotation of the feeding turret to the position indicated by A.

At the same time that the heel is being swung to position A, one of the pairs of chucks is also being moved to the same position, the chucks being spaced apart by a suitably timed motion of the cam 34. As rotation of the cam shaft 8 proceeds, the cam 34 will be oscillated in the manner previously described thus causing the chucks to grasp the heel, such motion taking place before rotation of the arm 11 has had time to impart an additional quarter turn to the star wheel and turrets. Such motion now takes place, the heel being advanced from position A to position B. During this motion of the heel the cutter mechanisms are swung backwardly from cutting position, as has been explained, and are held in retracted position until the heel arrives at position B when the cam 134 is rotated sufficiently to swing the cutters to cutting position.

The cam 63 is timed to start at this time rotation of the segment 57 to cause rotation of the chucks 25 and 26 so that the heels will be rotated to expose their entire periphery to the action of the cutter, motion of the arm sector 57 in one direction inducing a complete rotation of the heel, and reverse motion of the sector causing a complete rotation of the heel in the opposite direction. Arm 11 has by this time been rotated sufficiently to engage the next groove in the star wheel to rotate the turret frames another quarter turn to carry the heel to position C. A similar cutting operation takes place in this position, the cutter being swung to cutting position, and the heel being rotated as previously explained. The cutter, however, may be adjusted to cut a different edge of the heel from that cut in position B.

The next rotation of the star wheel by arm 11 will advance the heel to position D where it will be held until an oscillation of the cam 34 separates the chucks to release the heel. It is to be understood that the invention is not limited to the embodiment shown herein for purposes of illustration, but that on the contrary it may be variously embodied within the scope of the subjoined claims.

I claim as my invention:

1. In a trimming machine, a carrier, means on said carrier for holding an article to be trimmed, means to intermittently rotate said article holding means a single complete revolution with respect to said carrier, a cutter, and yielding means to hold said cutter against said article.

2. In a trimming machine, a carrier, means on said carrier for holding an article to be trimmed, and means to rotate said article holding means a single complete revolution in each direction with respect to said carrier.

3. In a trimming machine, a carrier, means on said carrier for holding an article to be trimmed, cam controlled means to rotate said article holding means a single complete revolution in each direction with respect to said carrier.

4. In a trimming machine, a carrier, means on said carrier for holding an article to be trimmed, means to rotate said article holding means a complete revolution in each direction with respect to said carrier, and means to release said holding means.

5. In a trimming machine, a carrier, means to rotate said carrier intermittently, means on said carrier adapted to grasp and hold an article to be trimmed, means to rotate said article holding means a single complete revolution in each direction with respect to said carrier and cam controlled means to release said holding means.

6. In a trimming machine, in combination, means for feeding articles to the trimmed to trimming position, means for rotating said articles in trimming position, a cutter, yielding means for holding said cutter in trimming position and cam controlled means for moving said cutter away from trimming position.

7. In a trimming machine, in combination, a plurality of trimming devices positioned to operate on different parts of the article, means for presenting an article to be trimmed successively thereto, and means for rotating said article in two directions in each trimming position.

8. In a trimming machine, in combination, a plurality of trimming devices positioned to operate on different parts of the article, means for presenting an article to be trimmed successively thereto, and means for rotating said article a complete revolution in two directions in each trimming position.

9. In a trimming machine, in combination, means for feeding an article to be trimmed to trimming position, means for intermittently rotating said article in trimming position, a cutter, and means for yieldingly holding said cutter against said article during rotation.

10. In a trimming machine, in combination, means for feeding an article to be trimmed to trimming position, means for rotating said article in trimming position, a cutter, and means for yieldingly holding said cutter against said article, whereby as said article is rotated, the shape of the article guides the cut.

11. In a trimming machine, in combination, means for feeding an article to be trimmed to trimming position, a cutter, means for yieldingly holding said cutter against said article, and means for moving said cutter from trimming position when said feed means is in operation.

12. In a trimming machine, in combination, means for feeding an article to be trimmed to trimming position, means for rotating said article in trimming position, a cutter, means for yieldingly holding said cutter against said article, whereby as said article is rotated, the shape of the article guides the cut, and means for moving said cutter from trimming position when said feed means is in operation.

13. In a trimming machine, means for grasping an article to be trimmed, means for advancing said grasping means with said article to trimming position, means for rotating said grasping means in trimming position, a cutter, and means for yieldingly holding said cutter against said article.

14. In a trimming machine, means for grasping an article to be trimmed, means for advancing said grasping means with said article to trimming position, means for rotating said grasping means in trimming position, a cutter, means for yieldingly holding said cutter against said article, and means for releasing said grasping means when said trimming operation is complete.

15. In a trimming machine, in combination, a cutter comprising an annular rotating cup and cooperating cutter head, and means for holding said cup in contact with an article to be trimmed during the trimming operation.

16. In a trimming machine, in combination, a cutter, comprising an annular rotating cup and cooperating cutter head, and yielding means for holding said cup in contact with an article to be trimmed during the trimming operation.

17. In a trimming machine, in combination, a cutter comprising an annular rotating cup and cooperating cutter head, and means for holding said cup in contact with an article to be trimmed and tangent to the periphery thereof during the trimming operation.

18. In a trimming machine, in combination, a cutter comprising an annular rotating cup and cooperating cutter head, and yielding means for holding said cup in contact with an article to be trimmed and tangent to the periphery thereof during the trimming operation.

19. In a trimming machine, in combination a cutter comprising an annular cup and a cooperating cutter head, both of said elements being mounted for rotation, means for rotating an article to be trimmed in trimming position, and means for holding said cup in contact with said article, whereby said cup is rotated thereby.

20. In a trimming machine, in combination, a cutter comprising an annular cup and a cooperating cutter head, both of said elements being mounted for rotation, means for rotating said cutter head, means for rotating an article to be trimmed in trimming position, and yielding means for holding said cup in contact with said article, whereby said cup is rotated thereby.

21. In a trimming machine, in combination, means for supporting an article to be trimmed by its periphery, means for rotating said article supporting means intermittently, means for grasping said article at points not on its periphery, and means whereby said grasping means may remove said article from said peripheral supporting means between successive motions thereof and convey it to trimming position.

22. In a trimming machine, in combination, means for supporting an article to be trimmed by its periphery, means for grasping said article at points not on its periphery, common means for imparting simultaneous divergent movement to said supporting and grasping means whereby said article is removed from said supporting means.

23. In a trimming machine, in combination, means for supporting an article to be trimmed by its periphery, means for grasping said article at points not on its periphery to remove it therefrom and common means for imparting intermittent motion to said supporting and grasping means to convey said article to trimming position.

24. In a trimming machine, in combination, means for supporting an article to be trimmed by its periphery, means for rotating said article supporting means intermittently, means for grasping said article at points not on its periphery, means whereby said grasping means may remove said article from said peripheral supporting means between successive motions thereof and convey it to trimming position, and means for rotating said article in trimming position.

25. In a trimming machine, in combination, means for supporting an article to be trimmed by its periphery, means for grasping said article at points not on its periphery to remove it therefrom, common means for imparting intermittent motion to said supporting and grasping means to convey said article to trimming position, and means for rotating said article in trimming position.

26. In a trimming machine, in combination, means for supporting an article to be trimmed by its periphery, means for rotating said article supporting means intermittently, means for grasping said article at points not on its periphery, means whereby said grasping means may remove said article from said peripheral supporting means between successive motions thereof and convey it to trimming position, and means to release said grasping means when the trimming operation is complete.

27. In a trimming machine, in combination, means for supporting an article to be trimmed by its periphery, means for rotating said article supporting means intermittently, means for grasping said article at points not on its periphery, means whereby said grasping means may remove said article from said peripheral supporting means between successive motions thereof and convey it to trimming position, means for rotating said article in trimming position, and means to release said grasping means when the trimming operation is complete.

28. In a trimming machine, in combination, means for supporting an article to be trimmed by its periphery, means for grasping said article at points not on its periphery to remove it therefrom, common means for imparting intermittent motion to said supporting and grasping means to convey said article to trimming position, means for rotating said article in trimming position, and means to release said grasping means when the trimming operation is complete.

In testimony whereof, I have signed my name to this specification this 8th day of August, 1923.

PENROSE R. HOOPES.